United States Patent
Sullivan et al.

(10) Patent No.: US 10,333,374 B2
(45) Date of Patent: Jun. 25, 2019

(54) RESISTIVELY GRADED INSULATION FOR STATORS

(71) Applicant: General Electric Company, Schenectady, NY (US)

(72) Inventors: Jeffrey Stuart Sullivan, Schenectady, NY (US); Christopher Michael Calebrese, Cohoes, NY (US); Qin Chen, Schenectady, NY (US); Alexander Rene Anderton, Mellingen (CH); Massimiliano Vezzoli, Remigen (CH)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 57 days.

(21) Appl. No.: 15/589,422

(22) Filed: May 8, 2017

(65) Prior Publication Data
US 2018/0323688 A1    Nov. 8, 2018

(51) Int. Cl.
| | |
|---|---|
| *H02K 3/30* | (2006.01) |
| *H02K 3/34* | (2006.01) |
| *H02K 3/40* | (2006.01) |
| *H01B 19/04* | (2006.01) |
| *H02K 15/10* | (2006.01) |
| *H02P 27/08* | (2006.01) |

(52) U.S. Cl.
CPC ........... *H02K 15/105* (2013.01); *H01B 19/04* (2013.01); *H02K 3/30* (2013.01); *H02K 3/345* (2013.01); *H02K 3/40* (2013.01); *H02P 27/08* (2013.01); *H02K 2213/03* (2013.01)

(58) Field of Classification Search
CPC .................................................. H02K 15/105
USPC ..................................................... 318/503, 34
See application file for complete search history.

(56) References Cited

U.S. PATENT DOCUMENTS

| | | | |
|---|---|---|---|
| 3,210,461 A | 10/1965 | Berg et al. | |
| 3,646,251 A | 2/1972 | Friedrich | |
| 5,471,144 A | 11/1995 | Meyer | |
| 5,903,128 A * | 5/1999 | Sakakibara | ............... H02P 6/18 |
| | | | 318/400.28 |
| 6,927,342 B1 * | 8/2005 | Brandes | .................... H02K 3/40 |
| | | | 174/110 R |

(Continued)

FOREIGN PATENT DOCUMENTS

EP    1903662 A1    3/2008

OTHER PUBLICATIONS

Clarke, David R.; "The microstructural location of the inter granular metal-oxide phase in a zinc oxide varistor", Journal of Applied Physics, vol. 49, pp. 2407-2411, 1978.

(Continued)

*Primary Examiner* — David Luo
(74) *Attorney, Agent, or Firm* — Fletcher Yoder, P.C.

(57) ABSTRACT

Insulation systems that present an electrical stress grading through the disposition of resistively graded networks between insulating layers is described. The resistively graded networks may be implemented by coating insulating material with resistive material, and wrapping the insulation material around a conductor. The resistive material may be linear or non-linear material. Fabrication of the insulating material, the resistive material, and the coating process are also discussed, as well as the application of the insulation to the conductor are also discussed.

22 Claims, 10 Drawing Sheets

(56) References Cited

U.S. PATENT DOCUMENTS

| | | | |
|---|---|---|---|
| 7,052,569 B2 | 5/2006 | Baumann et al. | |
| 8,207,813 B2 | 6/2012 | Tan et al. | |
| 8,384,338 B2 * | 2/2013 | Lu | H02P 21/16 |
| | | | 318/490 |
| 8,604,745 B2 * | 12/2013 | Villwock | G01R 31/34 |
| | | | 318/148 |
| 8,816,694 B2 | 8/2014 | Obata et al. | |
| 8,871,343 B2 | 10/2014 | Kikuchi et al. | |
| 9,059,616 B1 | 6/2015 | Rao | |
| 2014/0353000 A1 | 12/2014 | Yin et al. | |

OTHER PUBLICATIONS

Tan, Daniel Qi, et al.; "Nano-enabled Metal Oxide Varistors", IEEE Trans. DEI, vol. 16, Issue:04, pp. 934-939, Sep. 2009.

Donzel, Lise, et al.; "Nonlinear Resistive Electric Field Grading Part 2: Materials and Applications", IEEE Electrical Insulation Magazine, vol. 27, Issue: 02, pp. 18-28, Mar.-Apr. 2011.

Espino-Cortes, Fermin P., et al.; "Evaluation of tape-based stress grading coatings by infrared thermography" 2012 IEEE International Power Modulator and High Voltage Conference (IPMHVC), pp. 152-155, 2012.

Luo, Yang, et al.; "PD characteristics and microscopic analysis of polyimide film used as turn insulation in inverter-fed motor", IEEE Transactions on Dielectrics and Electrical Insulation, vol. 21, Issue: 5, pp. 2237-2244, Oct. 2014.

\* cited by examiner

RESISTIVELY GRADED INSULATION FOR STATORS

STATEMENT REGARDING FEDERALLY SPONSORED RESEARCH AND DEVELOPMENT

This invention was made with Government support under contract number DE-EE0007873 awarded by the Department of Energy. The Government has certain rights in this invention.

BACKGROUND

The subject matter disclosed herein relates to insulation in electrical motors and generators, and more specifically to methods and systems related to stator insulation.

Electrical motors and generators may employ an architecture that has a rotor that is magnetically coupled to a stator. In some designs, the stator may have coils that conduct large currents and are responsible for the creation and maintenance of the magnetic fields driving the electrical machine. In order to prevent short-circuit between the coil and the stator core, as well as between the windings in the coil, the coils may be covered with insulating materials. During operation of the electrical machines, these insulating materials may be subjected to large electric fields.

The insulation in coils may have imperfections such as air pockets or air gaps. For example, when an insulating tape is wrapped around metal bars that form the coil, undesired air gaps may appear between different layers of the insulating tape, around the edges of the tape, and between the tape and the conductor. During operation of the electrical machines, the large electric potential differences may generate very large electric fields in these air gaps. If the electric field becomes larger than a breakdown electric field of the air gap, partial discharge (PD) events may occur. Ionization of gases and electrical discharges due to PD events often lead to damage in the insulation material, leading to degradation in the performance and eventual failure of the electrical machine. Current solutions to the presence of PD in the insulation material for electrical machines are generally related to choice of material that resists PD damage, such as mica-based insulation. In electrical machines with large size and highly complicated winding structure, insulation applied using a lapped-tape system may be more reliable and cost-effective in spite of the presence of air gaps and voids, and resulting PD activity.

BRIEF DESCRIPTION

Certain embodiments commensurate in scope with the originally claimed disclosure are summarized below. These embodiments are not intended to limit the scope of the claimed disclosure, but rather these embodiments are intended only to provide a brief summary of possible forms of the disclosure. Indeed, embodiments may encompass a variety of forms that may be similar to or different from the embodiments set forth below.

Methods and systems described herein are related to electrical insulations that present a resistive grading network formed by placing a resistive material between insulation layers, and that may provide electrical stress grading.

In one embodiment an electrical machine having a stator is described. The electrical machine may have a plurality of insulating material layers that may cover the stator windings. The resistive material may be disposed between the layers of insulating material to form a resistive grading network.

In another embodiment, an electrical insulation is described. The electrical insulation may have a plurality of layers of an insulating film coated with a resistive material. The layers of insulating material form contact with neighboring layers via the resistive material coating.

A method is also described. This method may include processes to form a resistive material by embedding a filler in a coating binder. The fillers may have conductive particles and/or semiconductive particles. The fillers may also be non-linear, i.e., their conductivity may vary as a function of an applied electric field. The method may also include a process to form coat a polymer film tape with a resistive material to form an insulation tape. The method may also include a process for wrapping a conductor with the insulation tape such that there are at least two layers of insulation tape around the resistive material.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
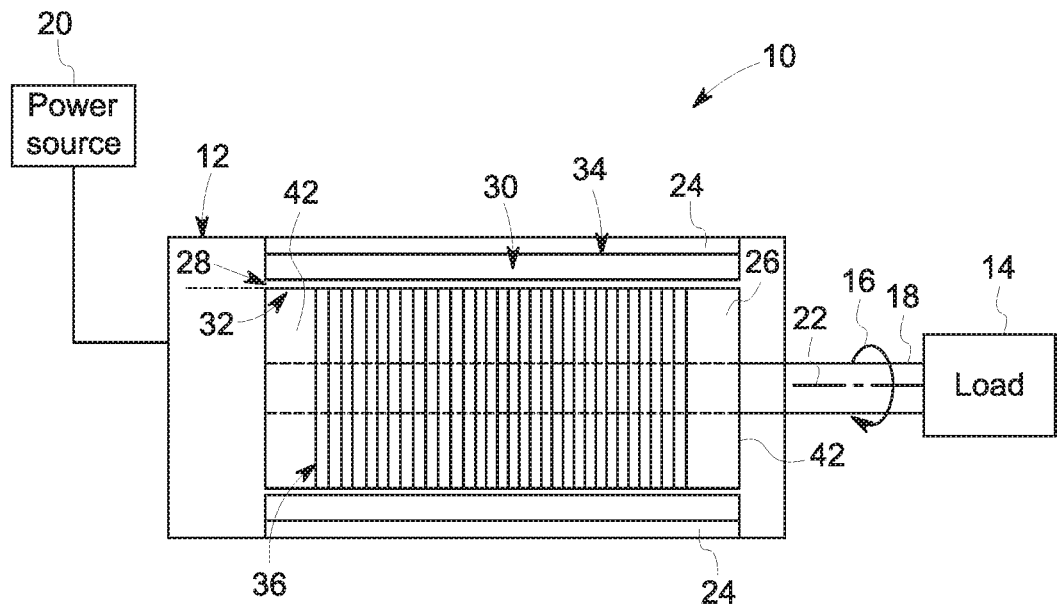
FIG. 1 illustrates an electrical motor that may employ stators having resistively graded insulation, in accordance with an embodiment.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present description relates to insulation in stators of high voltage electrical machines. Certain electrical machines such as converter-fed motors and/or generators perform the transformation between electrical and mechanical energy through an electromagnetic coupling between a stator and a rotor. For appropriate coupling, the stator may have conductor wires or bars that generate a magnetic field whenever a variable current travels through it. In order to prevent short-circuits between neighboring windings or to the stator core, the stator may be provided with insulation. Failure in the insulation of the stator is a cause of failure and damage to electrical machines.

A cause of failure in the insulation is the presence of partial discharges (PD) within the insulation. As discussed above, PDs may occur in air gaps that may be present within layers of the insulation material. If the electric field becomes larger than the breakdown voltage of the air gap, electrical discharges (e.g., sparks) may occur. Embodiments described herein are related to systems and methods that reduce the incidence of PDs from occurring within the insulation material. Materials and methods that provide a resistively graded insulation that reduces the electrical fields using stress graded networks may be described.

In some embodiments, the stress graded networks may be provided by a resistive material coating. The resistive materials may be conductive or semiconductive materials, and may be non-metallic. The conductivity of the resistive material may, for example, be between the conductivity insulators and that of metallic conductors. In some embodiments, the material employed to produce stress graded networks may present a non-linear conductivity (i.e., not following Ohm's law). In some embodiments, placement of the resistively graded insulation may be facilitated by the fabrication of an insulation tape that may be used to apply insulation around the stators. In some embodiments, methods for production of the tape and for application of the insulating material to the stators are discussed.

With the foregoing in mind, FIG. 1 is a schematic diagram that illustrates an embodiment of a rotational system 10 (e.g., rotary machinery such as turbomachinery) with an electrical motor 12 coupled to one or more loads 14. The electrical motor 12 may include, but is not limited to a converter-fed motor. In the rotational system 10, the electrical motor 12 provides a rotational output 16 to the one or more loads 14 via a shaft 18. The electrical motor 12 receives power (e.g., electric power) from a power source 20 that may include, but is not limited to, a motor drive, an AC power line (e.g., three-phase, single-phase), a battery, or any combination thereof. The one or more loads 14 may include, but are not limited to, a vehicle or a stationary load. In some embodiments, the one or more loads 14 may include a propeller on an aircraft, one or more wheels of a vehicle, a compressor, a pump, a fan, any suitable device capable of being powered by the rotational output of the electrical motor 12, or any combination thereof. The shaft 18 rotates along an axis 22. Note that, while the description generally discusses applications of the insulation system to electrical motors, the insulation system may also be applied to electrical generators, such as steam, gas, hydro, or wind turbines, tidal turbines, or other rotary electric generators.

The electrical motor 12 includes a stator 24 and a rotor 26. The rotor 26 may be disposed within the stator 24, offset by an airgap 28 between an interior surface 30 of the stator 24 and an exterior surface 32 of the rotor 26. As may be appreciated, the interior surface 30 of the stator 24 may be cylindrical. Stator poles 34 receiving power from the power source 20 are configured to generate magnetic fields to drive the rotor 26 and shaft 18 about the axis 22. The stator poles 34 may be powered so that the generated magnetic fields rotate about the axis 22. In the illustrated figure, stator poles 34 are placed parallel to axis 22, along the axial direction. Note that in some implementations, stator poles 34 may be placed along in a circumferential direction revolving the axis 22. In some embodiments, the stator poles 34 are axially spaced along the stator 24, opposite to laminations 36 of the rotor 26. The stator poles 34 are circumferentially spaced about the rotor 24. The power received from power source 20 may generate strong electric fields between wires in the coils of the stator poles 34. To prevent short circuits between the stator poles 34 and the body of stator 24 due to insulations degradation for PDs, resistively graded insulation may be provided, as discussed below. The magnetic fields of the stator poles 34 induce magnetic fields in channels of the laminations 36 to drive the rotor 26 and the shaft 18 about the axis 22.

Figure 2:
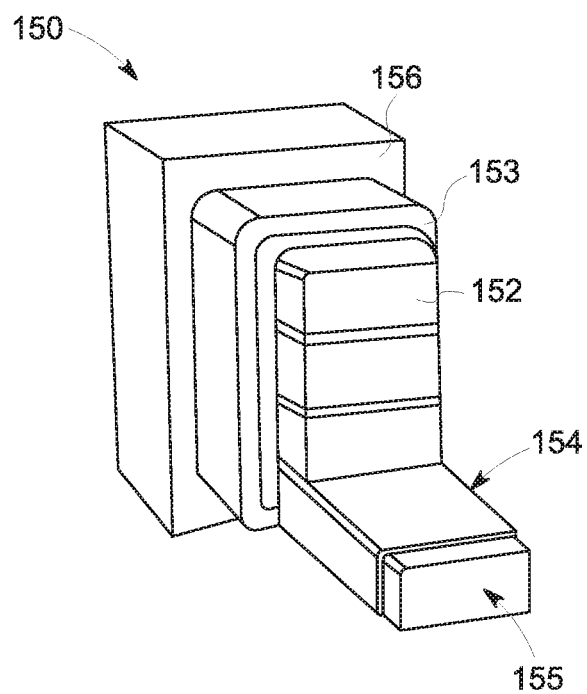
FIG. 2 illustrates a section of a stator coil with conductive bars covered with resistively graded insulation, in accordance with an embodiment.

A segment of stator 24 is illustrated in the view 150 of FIG. 2. View 150 shows a stator bar with four turns 152 surrounded by a groundwall insulation 153. Each turn 152 has a conductor part 155 which is insulated from the conductor part of the other turns 152 by the turn insulation 154. The turn insulation 154 prevents short-circuits between the turns 152 or between stator bars 152 and groundwall insulation 153. The groundwall insulation 153 may present an electrical stress grading system provided by a resistive network within the insulation. The turn insulation 154 may also present such an electrical stress grading system. In some implementations, as detailed below, this resistively graded insulation 153 may be formed by multiple layers of an insulator coated with a resistive coating. The resistive coating may provide an electrical stress grading system and may decrease the electric fields in undesirable air gaps formed within insulation 153, as discussed below.

Figure 3:
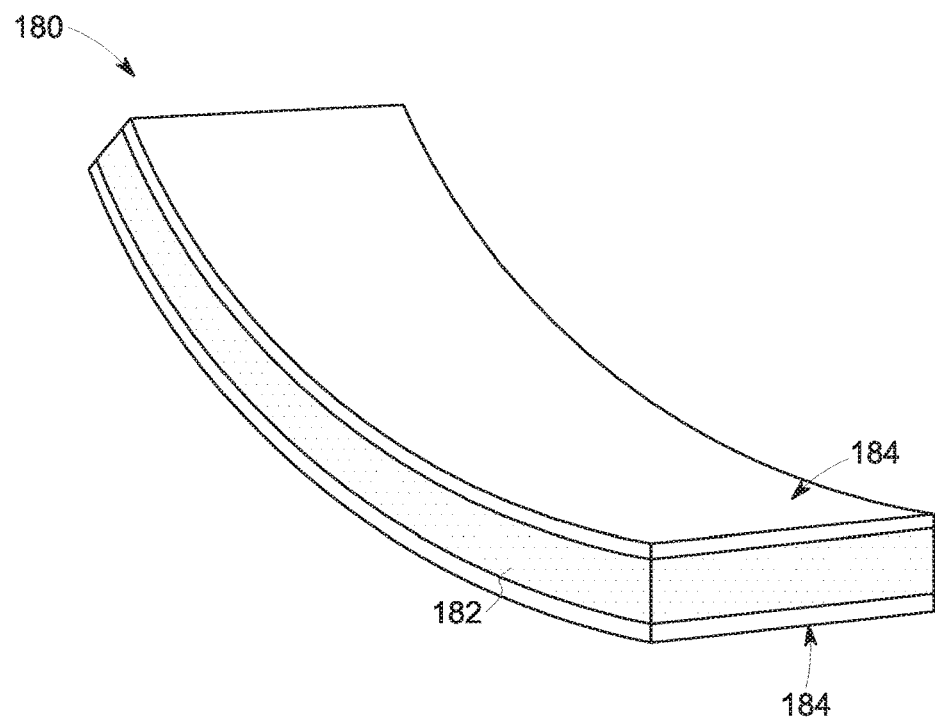
FIG. 3 illustrates a section of coated tape that may be used to provide resistively graded electrical insulation, in accordance with an embodiment.

FIG. 3 illustrates a section of a tape 180 that may be used to form a resistively graded insulation such as the groundwall insulation 153. Tape 180 may be formed by a core 182 composed of a polymer film that provides a dielectric barrier (i.e., a non-conductive film, an insulating film). The polymer employed may generally be materials that present a breakdown strength higher than 40 kV/mm, a dissipation factor smaller than 1%, and a dielectric constant smaller than 4.5, but other insulating materials may be applied. Examples of materials that may be used to form core 182 includes polyimide, polyether ketone (PEEK), polyethylene naphthalate (PEN), polyethylene terephthalate (PET), polyether imide (PEI/Ultem), or any of the various fluorinated or perfluorinated materials that may have high dielectric strength and/or high temperature resistance. As detailed below, the thermosetting (e.g., heat-shrinking) polymer films capabilities may facilitate application of the insulation, which may reduce the presence of air gaps or other imperfections, and may lead to reduction in partial discharge (PD) events. Thermoplastic (e.g., flowable) materials that respond to an applied pressure may also facilitate application of the insulation and reduce further the presence of air gaps within the insulation.

The core 182 of tape 180 may be covered with a resistive coating 184 in both sides of tape 180. The resistive coating 184 may employ materials having conductivity ranging from $10^{-8}$ S/m to 1 S/m. In some embodiments the resistive coating may employ non-linear materials, that is, materials that do not obey Ohm's law as discussed with respect to FIG. 11, and the conductivity could strongly depend on the electric field. The resistive coating may be produced by embedding fillers (e.g., conductive or semi-conductive particles) in a coating binder. Thermosetting and/or thermoplastic binders may be considered to facilitate the application of insulation tape 180. For example, the binder material used in the resistive coating 184 may have a thermal response comparable to that of the insulation polymer, or it may have a glass transition temperature higher than or lower than that of the insulation polymer, based on an intended behavior during application. A bi-stage resin may be used. In this situation, the resin curing may be incomplete during winding, and may have a sufficiently large molar mass or crystallinity to provide tack-free property. The resin may be completely cured at the time of manufacturing by placing the insulated bar in an oven with appropriate temperature and duration. For some binder materials, a solvent or any other thinner may be employed to facilitate application of the coating. Besides thermoplastic and thermoset polymers, the binder could also be a grease. The filler material embedded in the binder material may satisfy a percolating threshold and may occupy a proportion 10-60% of the total volume of the coating material. Examples of conductive particles include metal particles such as copper, silver, iron, tin, gold or any electrically conductive alloys. Examples of semi-conductive particles include such as silicon carbide, a tin oxide, an antimony oxide, zinc oxide, and other particles may be used. After application, the resistive coating may have a thickness of 0.1-200 µm.

Figure 4:
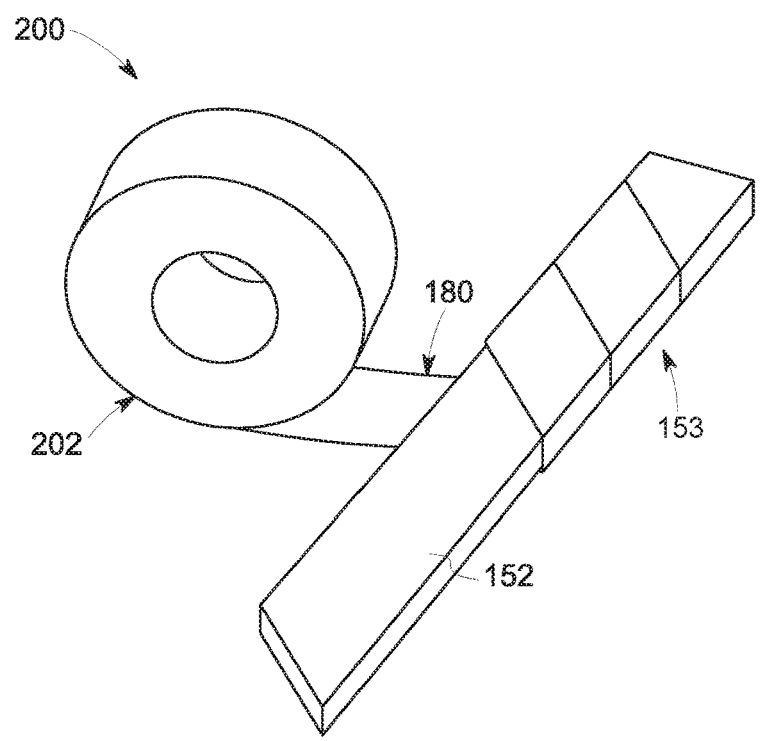
FIG. 4 illustrates a process to apply the coated tape of FIG. 3 to provide resistively graded insulation to a conductive bar, in accordance with an embodiment.
Figure 8A:
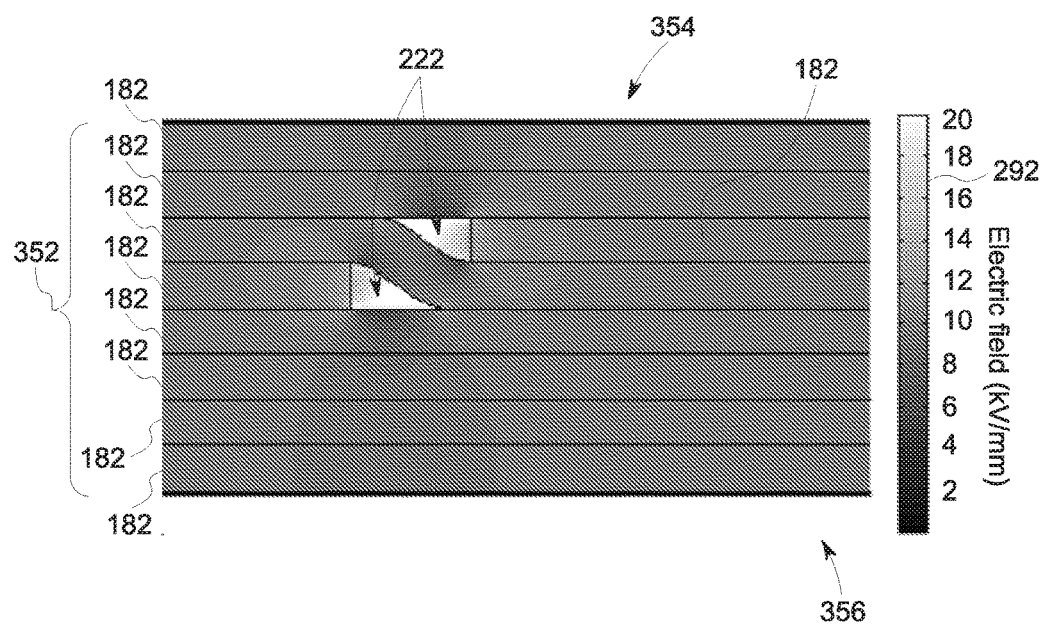
FIGS. 8A and 8B illustrate the effect of stress graded networks that may be formed by multiple layers of the coated tape of FIG. 3, in accordance with an embodiment.
Figure 8B:
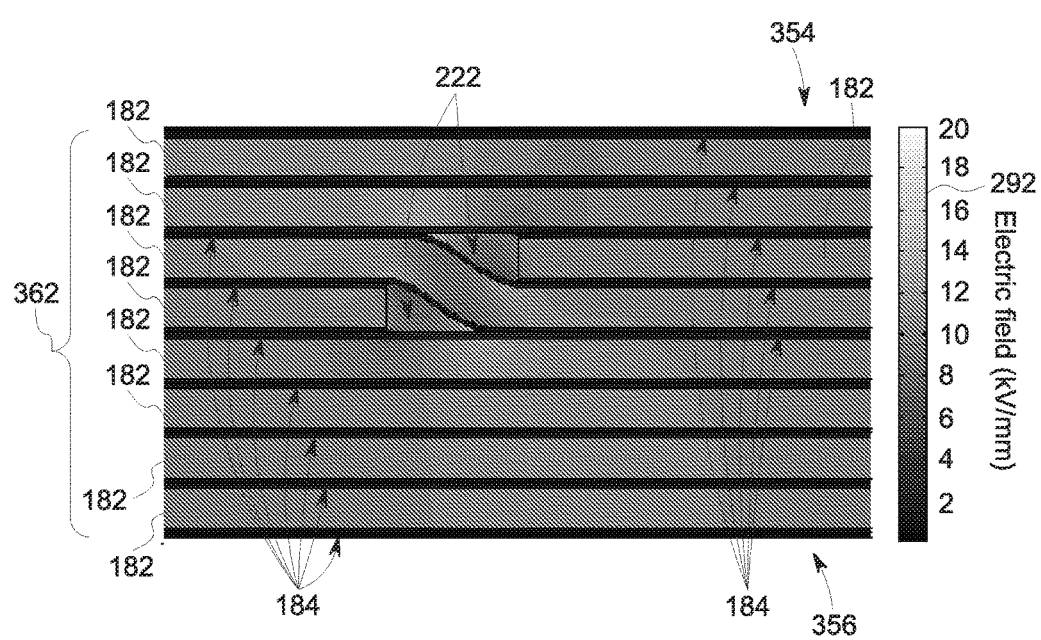

The illustration in FIG. 4 shows an application of a roll 202 of a tape 180 around a bar consisting of multiple turns 152. An insulation layer 153 may be formed by wrapping bar with tape 180. The insulation layer 153 may be formed by multiple overlapping layers of the tape 180, resulting in a stack of layers of tape. An increased number of layers of tape 180 may provide a better nominal range for voltage, as it increases the total breakdown voltage of the insulation. Since tape 180 is formed by an insulating core 182 covered with resistive coating 184, the resulting insulation 153 may be a stack of insulating layers separated by the resistive coatings, as illustrated in FIGS. 8A and 8B.

Figure 5A:
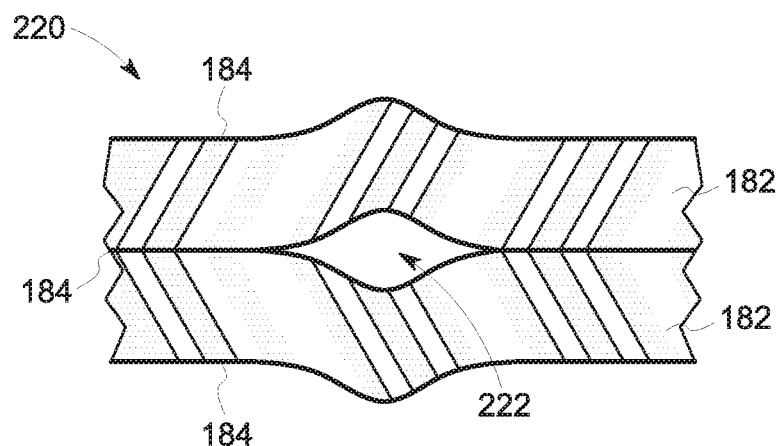
FIGS. 5A and 5B illustrate resistively graded networks formed by the coated tape of FIG. 3 around air gaps that may lead to resistively graded insulation, in accordance with an embodiment.
Figure 5B:
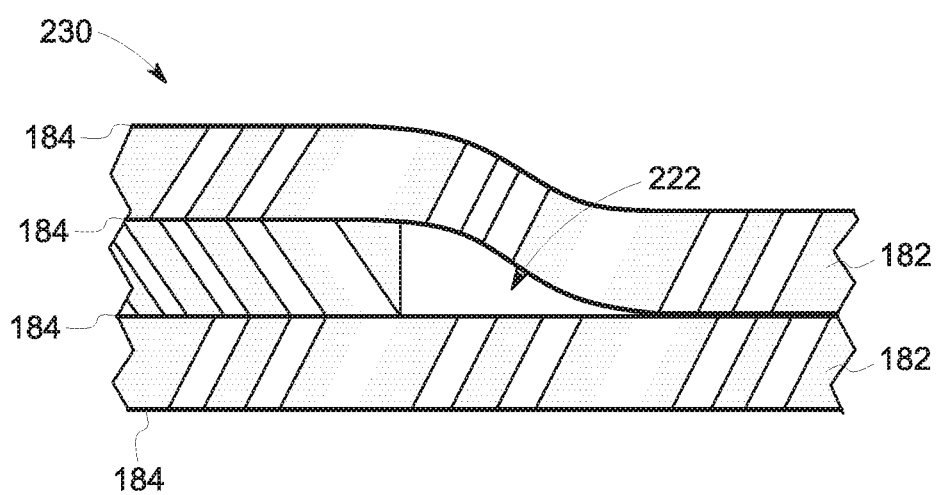

The process of wrapping tape 180 around bar may lead to imperfections within insulation layer 153. FIG. 5A illustrates a type of imperfection 220 in which an air gap 222 may be formed between two adjacent layers of tape 180. Air gap 222 may occur, for example, by an accidental slack in the tension on the tape during the application around bar 152. Note that coating 184 around the core 182 encircles the entire air gap 222. FIG. 5B illustrates a second type of imperfection 230 within the insulation layer 153. In this imperfection 230, an air gap 222 may appear in regions where a layer of tape 180 begins or ends. In these situations, air gap 222 may be formed due to natural limitations in the flexibility of tape 182. In this example, coating 184 may coat many of the internal surfaces of air gap 222, but in some portions, the tape 182 polymer may be exposed to the air gap 222. Air gap 222 in FIGS. 5A and 5B may have a dimension ranging from 1 µm to 1 mm.

Figure 6A:
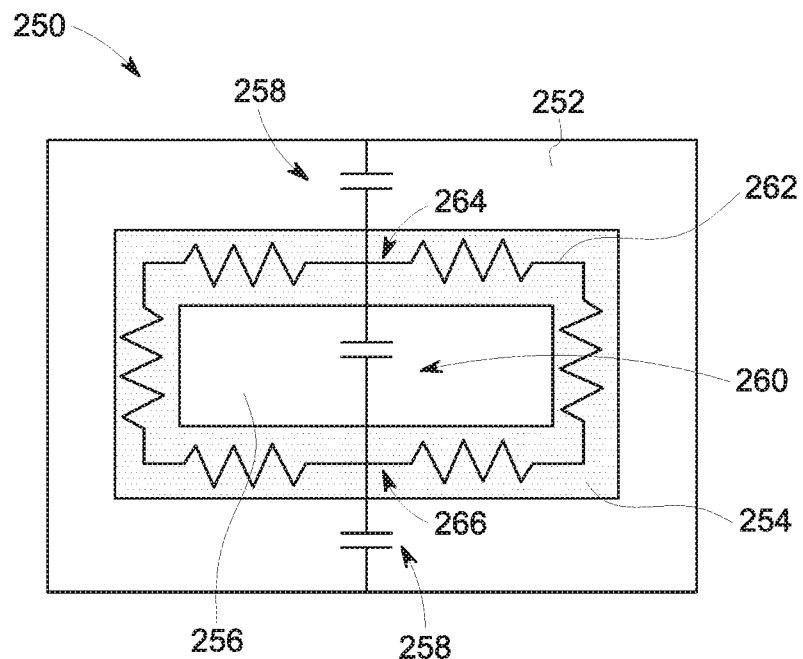
FIG. 6A and FIG. 6B illustrate an electrical circuit that illustrates the resistively graded networks of FIGS. 5A and 5B, in accordance with an embodiment.

In both air gaps 222 of FIGS. 5A and 5B, note that the coating 184 may provide a resistive network that may be similar to a Faraday cage around air gap 222. As a result, coating 184 may provide electrical stress grading across the air gap by providing a resistive route with significantly lower impedance than that of the air gap, which may decrease the differences in the electrical potential between different points of the air gap. As a result, coating 184 may decrease ionization effects within air gap 222 and PD effects. FIG. 6A illustrates this effect with an electrical circuit diagram with an electrical model 250 for the resistive network around air gap 222. In this model 250, the insulation material 252 is coated with a resistive coating 254 surrounding an air gap 256. The dielectric of insulation material 252 may be electrically modeled as capacitances 258 and the air gap may be modeled as a capacitance 260. The resistive coating 254 forms the resistive network 254. Note that the resistive network 262 is in a parallel circuit to capacitance 260 and, the higher the conductance in resistive network 262, the lower the difference of potential between terminals 264 and 266. It should be noted that the resistive coating may provide the above described properties even if the conductivity small. For proper function, the conductivity should be sufficiently high to ensure the electric field in the air gap is below the breakdown voltage. Note also that the lower conductivity may reduce resistive loss in the insulation.

Figure 6B:
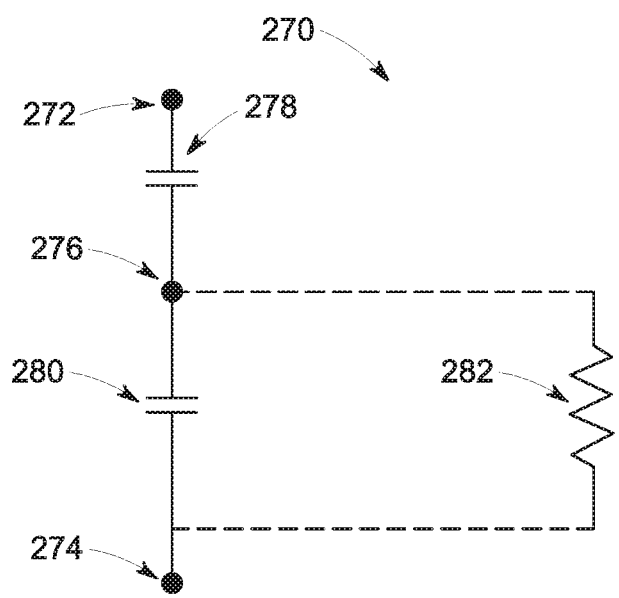

FIG. 6B illustrates an equivalent circuit 270 having a lumped components to model the effect described above. Lumped capacitance 278 models capacitances 258, lumped capacitance 280 models air gap capacitance 260 and lumped resistance 282 models the resistance network 262. As a difference of potential between terminals 272 and 274 of the equivalent circuit 270 increases, the difference of potential across the capacitance 280 may also increase. This is represented by the difference of potential between terminals 276 and 274. The presence of the lumped resistance 282 may reduce the voltage between terminals 276 and 274, which reduces the voltage on capacitance 280. This may correspond to a reduction in the electric field in air gap 256 due to the presence of the stress grading material 254, which may decrease the occurrence of PD events. Note further that if the lumped resistance 282 is provided by a stress grading material that has non-linear properties such that the conductivity increases with the difference of potential, the lumped resistance 262 may effectively limit the difference of potential between terminals 274 and 276 while allowing some preventing loss of energy when the difference of potential between terminals 274 and 276 is low.

Figure 7A:
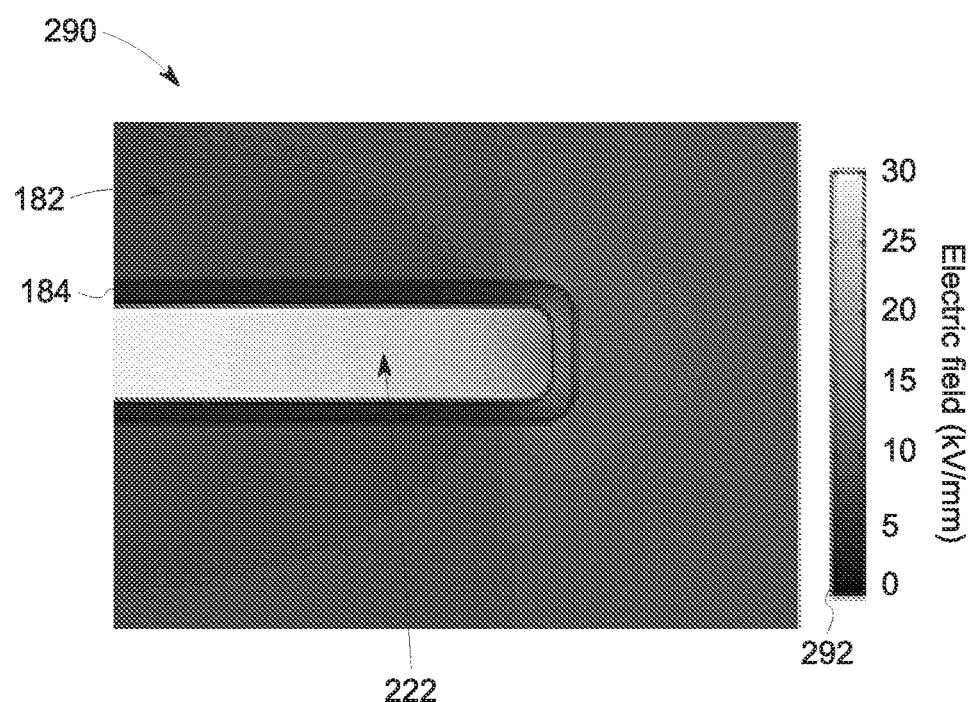
FIG. 7A and FIG. 7B illustrate the stress grading effect of the resistive networks around air gaps, in accordance with an embodiment.
Figure 7B:
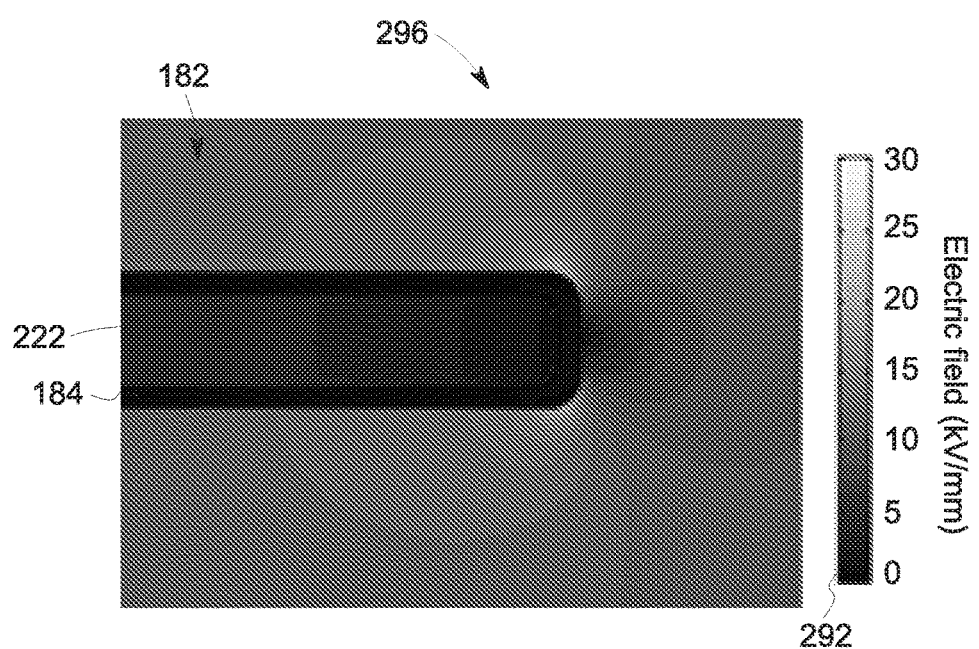

Heatmaps 290 in FIG. 7A and 296 in FIG. 7B illustrate the effect of the conductivity of the material employed in the stress graded network. In heatmaps 290 and 296, an insulation layer may have an insulation material 182, a stress grading material 184 and an air gap 222. Air gap 222 may be a disc-shaped void diameter of 0.2 mm and 0.02 mm thickness. The heatmap 290 illustrates a value of the electric field 292 in each portion of the heatmap as the insulation undergoes a 250 kHz high voltage that generates an average field of 10 kV/mm (RMS). The heatmap 290 may correspond to a situation in which the conductivity of the stress grading material is of $10^{-5}$ S/m. The resulting electrical fields within the airgap may be as large as 30 kV/mm, which may ca use PD events. Heatmap 296 may correspond to a situation in which the stress grading material 184 may have a higher conductivity of $10^{-2}$ S/m. In this situation, the electric field inside the airgap is much smaller, in the order of 5 kV/mm. This reduction in the electric field in the air gap 222 from the increase in the conductivity in the stress grading material 184 may be associated with the decrease in the potential difference across different points of the stress grading material 184.

FIG. 8A shows the large electric fields that may occur when there is no resistive coating employed as a stress grading material in insulation 352. In this example, the tape thickness is 0.1 mm, and the maximum width of the void is 0.2 mm. Insulation 352 may be formed by several tape layers of an insulation material 182. Insulation 352 may also have air gaps 222 that may be formed due to imperfections during application of the insulation material 182. Note that in insulation 352, the layers of insulation material are not coated with a stress grading material, and therefore the conductivity between layers of insulation material 182 may be very poor. As a result, when an electrical potential difference is applied between the top 354 and the bottom 356 of the insulation layer, very little electrical stress grading occurs across the insulation 352. As discussed above, this may lead to the very large electric fields 292 in air gaps 222 (~20 kV/mm in this example), leading to PD processes if this electric field becomes higher than the breakdown electric field.

FIG. 8B shows how the inclusion of a resistive coating may provide better stress grading across an insulation 362 and prevent PDs. In insulation 362, the layers of insulation material 182 may be coated with a conductive stress grading material 184. The insulation film thickness is 0.1 mm, and there is a 5 um thick resistive coating on the each surface of the insulating tape. Insulation 362 may also have air gaps 222 similar to the ones of insulation 352. However, due to the improved stress grading network from stress grading material 184, when an electric potential difference is applied between the top 354 and the bottom 356 of the insulation layer, the electric field 292 observed in the air gaps are smaller (~8 kV/mm in this example) and may be below the breakdown voltage of air gap 222. As a result, application of a stress grading material 184 to tapes of the insulation material 182, and subsequent use of the coated tapes to provide insulation for stators may substantially reduce PDs phenomenon in stator insulation.

Figure 9:
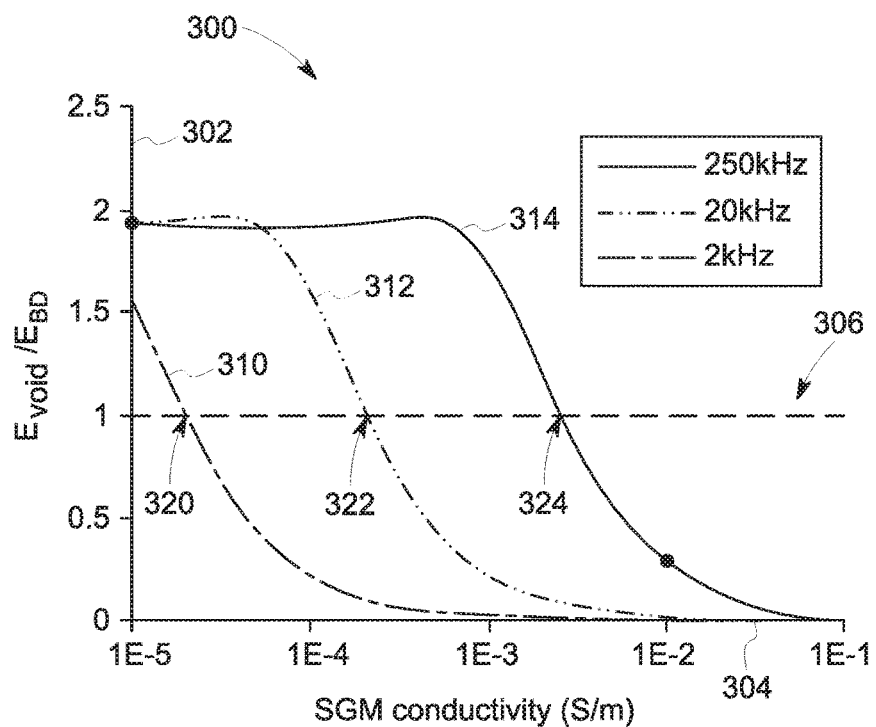
FIG. 9 provides a chart that depicts the effect of the frequency of the voltages across the resistively graded insulation, in accordance with an embodiment.

Chart 300 in FIG. 9 illustrates how changes in the operating frequency of the machine employing the stators with resistively graded insulation affects the behavior described herein. The chart shows a ratio 302 between the electrical field in a 0.2 mm diameter air gap and the breakdown electrical field as function of the conductivity 304 of the stress grading material. When the ratio 302 goes above a threshold 306, PDs may occur. Threshold 306 may be associated to the ratio 302 being equal to 1 as a ratio above the threshold indicates that the electric field in the air gap is higher than the breakdown electric field. In these conditions, the air gap dielectric ionizes and allows a discharge, which may lead to PD. Ratio 302 is shown for signals having a low frequency 310 (2 kHz), a medium frequency 312 (20 kHz), and a high frequency 314 (250 kHz). Note that for the frequencies tested, there may be a minimum conductivity 304 (e.g., point 320 for low frequency 310, point 322 for medium frequency 312, and point 324 for high frequency 314) that makes the ratio 302 to become smaller than threshold 306. Note further that as the frequency increases, the minimum conductivity that prevents PD also increases, as illustrated by the conductivity 304 of points 320, 322, and 324.

The impact of high frequency signals may be particularly important in applications having a pulse-width modulation (PWM) controlled drive. In such systems, the electrical signal may be a low frequency signal being carried in a square wave carrier signal. In such applications, even if the nominal operation frequency of the machine may be low, the PWM carrier signal contains high frequency components that may be applied to the stator coils. Accordingly, in such applications, the resistively graded insulation may be subject to frequencies that are much higher than the nominal operation frequency of the machine.

Figure 10:
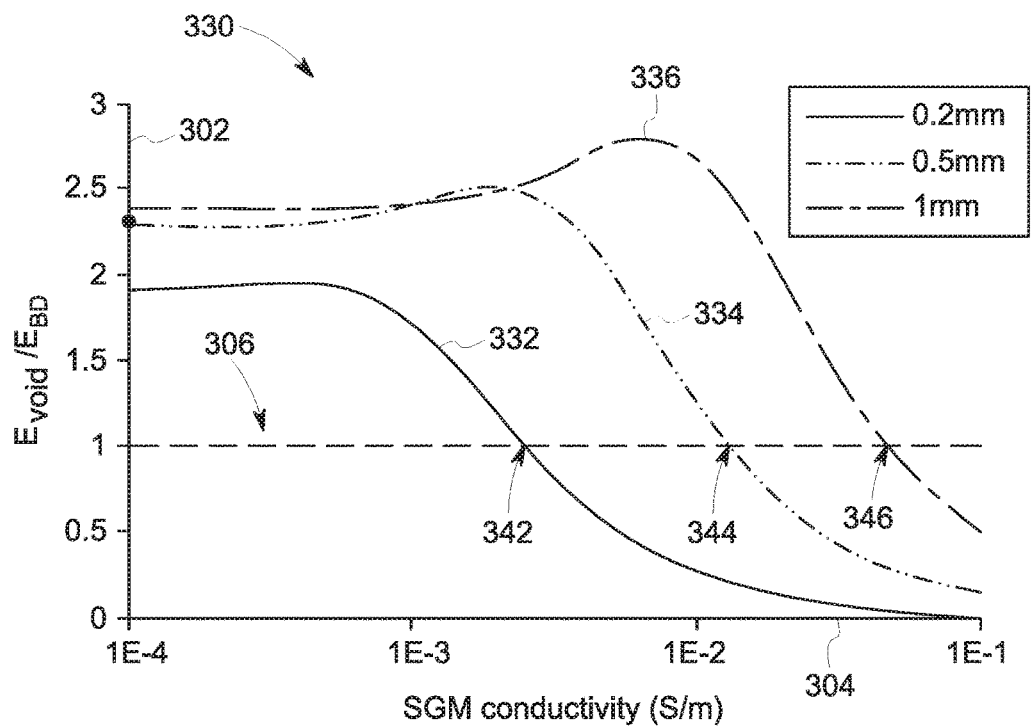
FIG. 10 provides a chart that depicts the effect of the dimensions of air gaps in a resistively graded insulation, in accordance with an embodiment.

Chart 330 in FIG. 10 illustrates how dimensions in the air gap may affect PD phenomenon. In this example, spherical voids with different diameters are considered. The chart shows how a ratio 302 between the electrical field and the breakdown electrical field varies as a function of the conductivity 304 of the stress grading material in an insulation under a 250 kHz electric field. Ratio 302 is shown for small voids 342, medium voids 344, and large voids 346. As in chart 300 in FIG. 8, there may be a minimum conductivity 304 (e.g., point 342 for small voids 332, point 344 for medium voids 334, and point 336 for large voids 346) at which ratio 302 is smaller than threshold 306. Note further that, as the voids dimensions increase, the minimum conductivity that prevents PD also increases, as can be seen by the conductivity 304 of points 342, 344, and 346. Charts 300 and 330 shows that, for a linear stress grading material (i.e., a material that obeys Ohm's law), increased signal frequency and increased dimensions in the voids may require a more conductive coating to prevent PDs.

Figure 11:
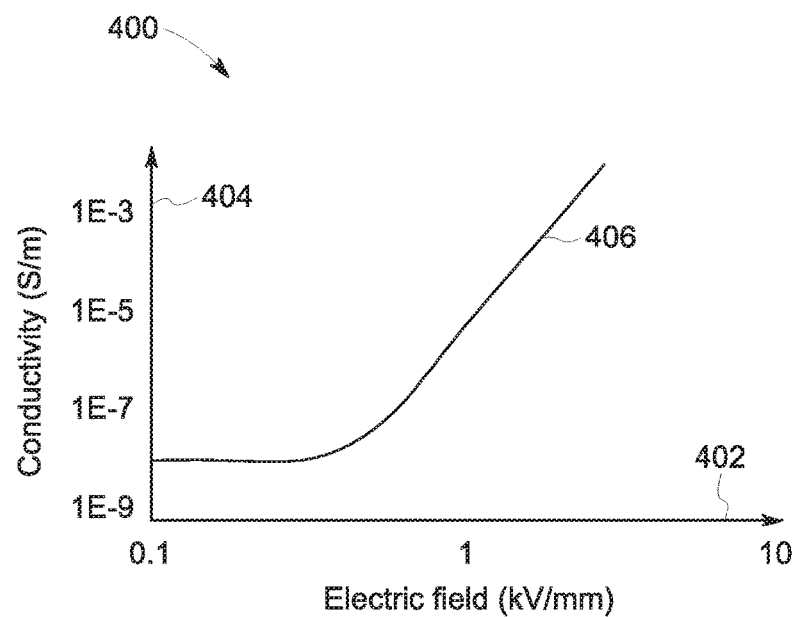
FIG. 11 provides a chart that illustrates a non-linear material that may be used to provide non-linear resistively graded networks for electrical stress graded insulation, in accordance with an embodiment.
Figure 12A:
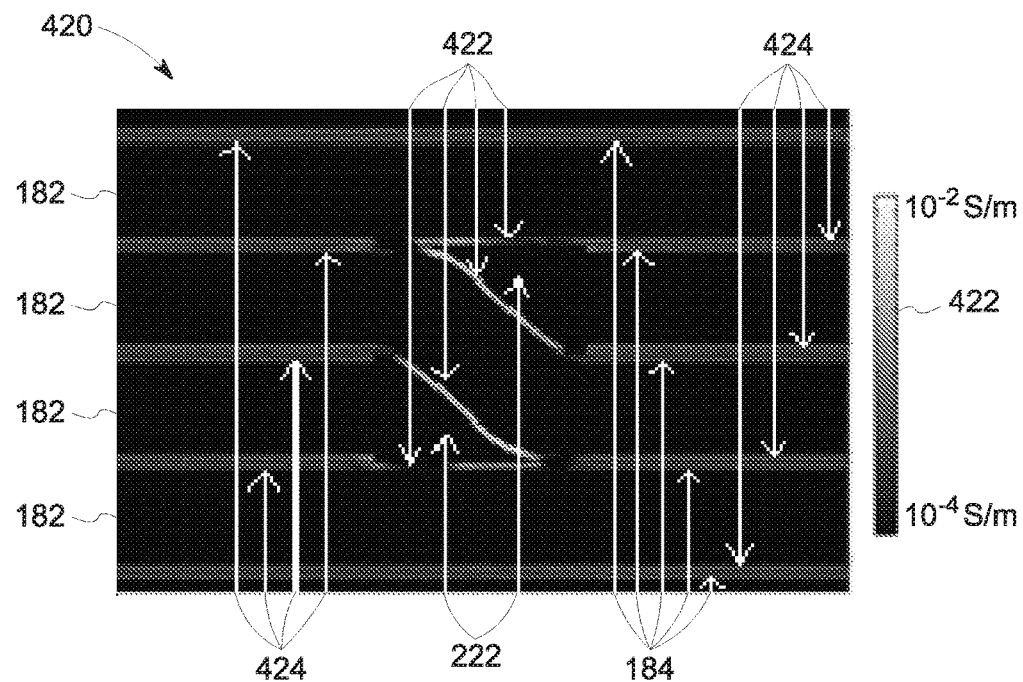
FIGS. 12A, 12B, and 12C illustrate the effect of the usage of the non-linear material of FIG. 11 in a resistively graded insulation system, in accordance with an embodiment.

The results above in FIGS. 9 and 10 are associated with linear stress grading material. However, coatings that may have non-linear resistive behavior may also be employed. Chart 400 in FIG. 11 illustrates the electrical behavior of one such material. Specifically, chart 400 shows that for such material, as the electric field 402 increases, the conductivity 404 may increase as well (curve 406). If such material is disposed between layers of insulation, as illustrated above, the resulting resistive network may show low conductivity in regions where the electric field is low and a high conductivity in regions where the electric field is large, such as around air gaps. The low conductivity in regions with smaller electric fields may increase the efficiency of the electrical machine as it decreases the currents in the resistive network. The above-discussed effect of employing a non-linear stress grading material 184 with the behavior of curve 406 as coating for insulation layers 182 in an insulation 420 is illustrated in FIG. 12A. As discussed above, an electric field may become very large around the air gaps 222. As a result, the conductivity 422 of the stress grading material 184 around air gaps 222 may become very large, such as in sections 422 of the stress grading material 184. By contrast, sections 424 of the stress grading material that are not near the air gaps 222 may have a low conductivity, which may decrease the electrical currents.

Figure 12B:
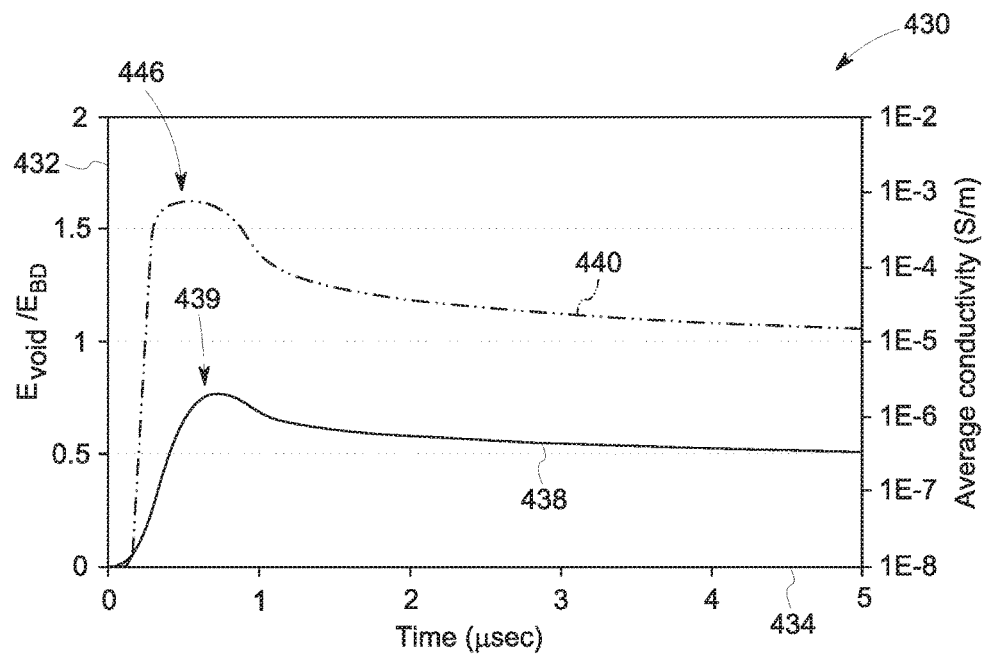
Figure 12C:
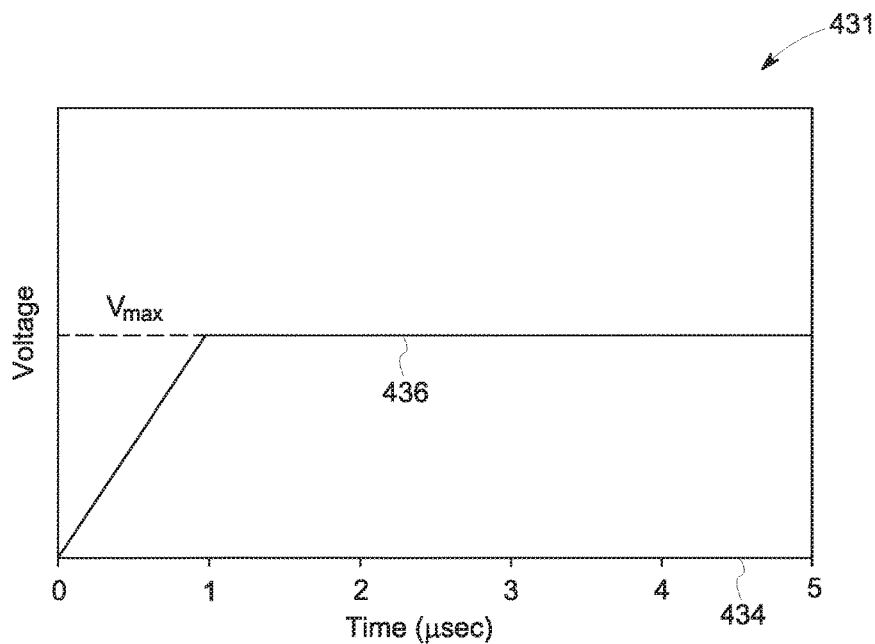

Chart 430 in FIG. 12B and 431 in FIG. 12C show the transient response in an insulation layer. Specifically, the chart show how the ratio 432 between the electric field in air gap 222 and the breakdown electric field varies as a function of time 434, and how the conductivity 435 of the non-linear stress grading material 184 varies as a function of time 434. The transient is measured with respect to a voltage 436 that increases from 0 to a voltage $V_{MAX}$ with a 1 μs rise time. Note that the electric field 438 in the air gap increases to a peak 439 below a ratio 432 of 1, and stabilizes in a lower value. The transient observed in electric field 438 may be a consequence of the change in the conductivity of the non-linear material 440 observed. The conductivity of the non-linear material 440 may reach a peak 441 before stabilizing in a lower conductivity. Note that the conductivity of the non-linear material 440 may reach $\sim 10^{-3}$ S/m to prevent PD during the transient, before settling at a much lower $\sim 10^{-5}$ S/m. This adjustment behavior of the conductivity of the non-linear material 440 allows large currents to alleviate high electric fields and prevent PDs without allowing large currents when the electric fields are low. As a result the effective DF of the insulation is low, improving the losses and self-heating compared to the use of a linear material.

Figure 13:
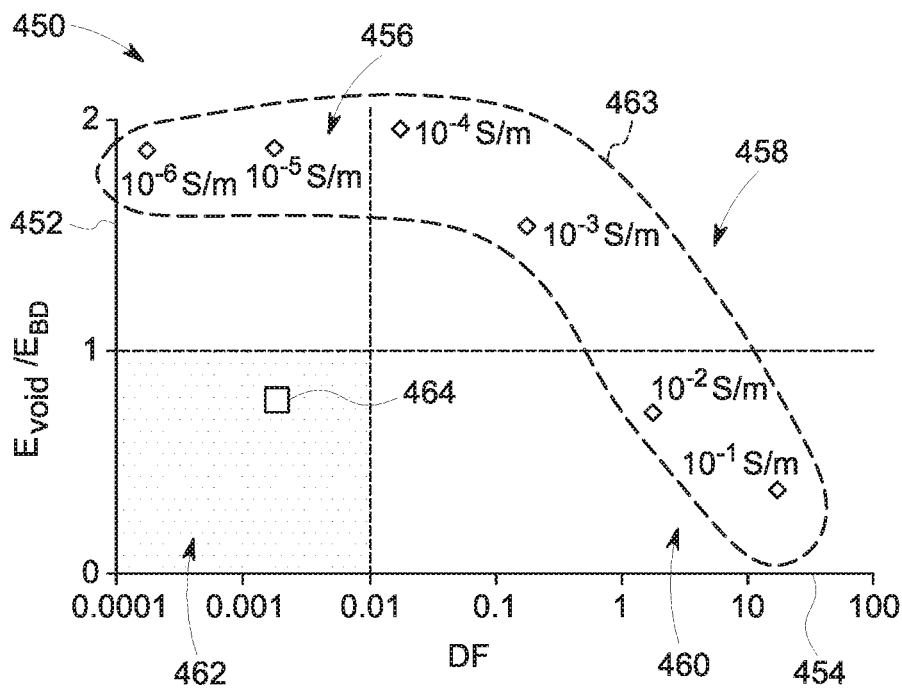
FIG. 13 provides a chart for a performance of a resistively graded insulation system with linear and non-linear materials, in accordance with an embodiment.

The tradeoff between PD and DF discussed above in linear stress grading materials, and the improvement provided by the use of non-linear stress grading materials is illustrated in chart 450 of FIG. 13. This chart provides the ratio 452 between the electric field in air gap 222 and the breakdown electric field as a function of the DF 454. Dissipation factor (e.g., DF 454) is defined as the ratio between the energy loss and the total energy in the insulation system. The DF provides a measure of energy losses (e.g., thermal losses) that may occur in an insulation of an electrical machine under an oscillating signal. Quadrant 456 illustrates a region of chart 450 with an insulation with low losses and high PD incidence (e.g., ratio 452 may be higher than 1 and DF 454 is low). Quadrant 458 illustrates a region of chart 450 with an insulation with high losses and high PD incidence (e.g., ration 452 may be higher than 1 and DF 454 is high). Quadrant 460 illustrates a region of chart 450 of an insulation with low PD incidence, but high losses (e.g., ratio 452 may be lower than 1 and DF 454 is high). Quadrant 462 illustrates a region of chart 450 of an insulation with little PD, low losses (e.g., ratio 452 may be lower than 1 and DF 454 is low). Generally, an insulation layer in quadrant 462 may provide a better tradeoff, as discussed above. Region 463 of the chart illustrate how linear stress-grading material with different conductivities may behave. At low conductivity, linear stress-grading material provides insulation in quadrant 456. As the conductivity increases, stress-grading materials show less PD incidence, but the DF increases as a tradeoff (quadrant 460). The use of a non-linear stress grading material 464 may lead to an insulation in quadrant 462. Accordingly, the use of a non-linear stress grading materials may be lead to an insulation with little losses and little partial discharges, which may result in a highly efficient and highly reliable electrical machine.

Figure 14:
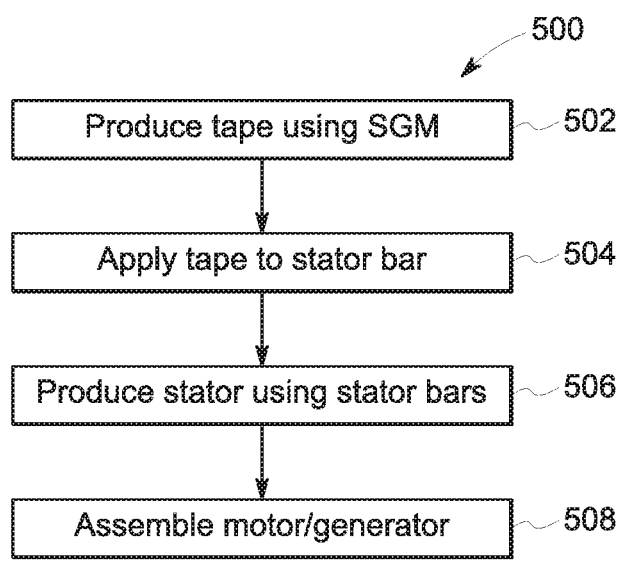
FIG. 14 illustrates a method for producing electrical machines with resistively graded insulation, in accordance with an embodiment.

Flow chart 500 of FIG. 14 illustrates a method to provide an electrical machine with an insulation that may have stress grading materials over the layers. A process 502 may include forming a conductive coating by embedding filler particles in a coating binder. A solvent or a thinner may be added to the coating binder and this binder may be applied to a tape produced from an insulation material. Process 502 may have a step to coat both surfaces of the tape with the conductive coating. As discussed above, the resistive material may be a linear conductive material or non-linear conductive material. In some implementations, the tape may be coated through a gravure coating and/or a roll coating process. In other implementations, the coating may be applied to a long sheet of the insulation material, which may be later cut and rolled into produced the tape. The coating may also be an inorganic thin film applied using vacuum deposition techniques, such as sputtering, evaporation, or chemical vapor deposition. The insulation material may be a polymer film, as discussed below. In some implementations, the resistive material may be deposited on the surface of the polymer film, or it may be added to the polymer film during its formation.

The tape having the coated resistive material may be then applied to a conductive bar that may be used in a stator (process 504). During the application, the tape may be wrapped such that multiple layers of the tape overlap, resulting in a stator bar covered by an insulation having multiple tape layers. The interface between the multiple tape layers may be formed by the resistive coating. Wrapping may be performed employing automated processes for composite tapes. The coatings in the multiple insulation layers may create a stress grading network which may decrease the incidence of PD effects, as discussed above. PDs may be further reduced by employing a process that prevents the formation of air gaps or pockets where PD occurs during process 504. For example, if the tape is formed from a thermosetting, thermoplastic, or heat-shrinking materials, process 504 may include adjustments to the temperature and/or pressure during and after the application of the tape to decrease the dimensions of potential air gaps. The stator bars may be then placed adjacent to other stator bars to form stator coils and/or wires (process 506). The stator may be coupled to a rotor and a casing to assemble a motor and/or a generator (process 508).

The systems and methods described herein may allow for electrical insulation methods and systems that may improve the reliability and efficiency of electrical machinery. The insulation systems may be applied to stators in high-voltage, high-frequency generators and/or motors, and may present a smaller incidence of partial discharge (PD) events and formation of ionized free radicals in the air gaps. This reduction in PDs may be achieved through by the presence of electrical stress grading network around air gaps and/or other imperfections in the insulation.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:
1. An electrical machine comprising:
a stator, the stator comprising:
an insulation that comprises:
a plurality of insulating material layers; and resistive material disposed between the layers of insulating material, wherein the resistive material form a resistive grading network, and wherein the resistive material is formed by embedding a filler comprising conductive particles, semiconductive particles, or any combination thereof into a coating binder.

2. The electrical machine of claim 1, wherein the resistive material is characterized by a non-linear conductor behavior.

3. An electrical insulation for a conductor comprising:
a plurality of layers configured to cover a conductor, each layer comprising:
an insulating film; and
resistive material coating the film;
wherein each layer contacts a neighboring layer of the resistive material coating, and
wherein the resistive material coating is characterized by a non-linear relationship between electric field and conductivity.

4. The electrical machine of claim 1, wherein the resistive material comprises a linear resistive material with a conductivity above $10^{-2}$ S/m.

5. The electrical machine of claim 1, wherein the machine comprises an electrical motor.

6. The electrical machine of claim 5, wherein the machine comprises a converter-fed motor.

7. The electrical machine of claim 5, comprising a power source that provides a signal to the electrical motor.

8. The electrical machine of claim 7, wherein the signal comprises a frequency above 200 kHz.

9. The electrical machine of claim 7, wherein the signal comprises a PWM signal.

10. The electrical insulation of claim 3, wherein the conductivity of the electric coating is less than $10^{-4}$ S/m when the electric field is between 0 kV/mm and 1 kV/mm and more than $10^{-3}$ S/m when the electric field is above 3 kV/mm.

11. The electrical insulation of claim 3, wherein the insulating film comprises an insulating polymer material.

12. The electrical insulation of claim 11, wherein the insulating film comprises a polyimide, polycarbonate, polypropylene, polyethylene, polyphenylene sulfide (PPS), polytetrafluoroethylene (PTFE), a polyether ether ketone (PEEK), polyethylene terephthalate (PET), polyethylene naphthalate (PEN), polyether imide (PEI/Ultem).

13. The electrical insulation of claim 3, wherein the insulating film has a breakdown strength higher than 40 kV/mm.

14. The electrical insulation of claim 3, wherein the material comprises a polymer composite that comprises semiconductive particles, semiconductive small organic molecules, semiconducting polymers, conducting polymers, or any combination thereof.

15. The electrical insulation of claim 14, wherein the semiconductive particles comprise silicon carbide, a tin oxide, an antimony oxide, or zinc oxide.

16. The electrical insulation of claim 3, wherein the plurality of layers is obtained by wrapping a tape around the conductor, wherein the tape comprises a wrapped insulating film coated with the resistive material.

17. A method comprising:
coating a polymer film tape with a resistive material to produce an insulation tape; and
wrapping a conductor with the insulation tape to provide at least two layers of the insulation tape around the resistive material,
wherein the polymer film tape has a thickness between 5 um and 1 mm, and
wherein the resistive material has a thickness between 0.1 um to 200 um.

18. The method of claim 17, comprising:
embedding a filler comprising conductive particles, semiconductive particles, or any combination thereof in a coating binder to form a resistive material.

19. The method of claim 18, wherein the coating binder comprises a thermoplastic binder, a thermosetting binder, a heat-shrinking binder, a grease binder, or any combination thereof.

20. The method of claim 18, wherein embedding the filler in the coating binder comprises loading the filler at a concentration above a percolating threshold.

21. The method of claim 17, wherein the polymer film tape comprises a thermoplastic material, and wherein the method comprises applying a pressure and temperature to reduce void content.

22. The method of claim 17, wherein the conductor comprises a stator bar.

* * * * *